United States Patent [19]

Batalden et al.

[11] Patent Number: 4,631,706

[45] Date of Patent: Dec. 23, 1986

[54] SYSTEM FOR PREVENTING THE OVERWRITING OF PREVIOUSLY OPTICALLY RECORDED DATA AND FOR READING OPTICALLY RECORDED DATA DURING WRITING

[75] Inventors: Glenn D. Batalden; Duane W. Baxter, both of Rochester; Neil R. Davie, Spring Valley, all of Minn.

[73] Assignee: International Business Machines Corporation, Armonk, N.Y.

[21] Appl. No.: 672,559

[22] Filed: Nov. 19, 1984

[51] Int. Cl.⁴ ............................................. G11C 13/00
[52] U.S. Cl. ..................................... 365/215; 365/189; 365/127
[58] Field of Search ............... 365/215, 189, 120, 121, 365/127

[56] References Cited

U.S. PATENT DOCUMENTS 4,575,820 3/1986 Barditch ............................. 365/215

*Primary Examiner*—Terrell W. Fears
*Attorney, Agent, or Firm*—Homer L. Knearl

[57] ABSTRACT

An optical file system in which a command to store data results in a write operation in the next available storage position. A single optical path is used for both reading and writing. By dividing the detector in two equal parts along the direction of relative movement, it is possible to determine whether data has been written at a position which is in advance of the center of the area viewed by the detector. The write operation is conditioned on the output of the first part of the detector. Since the first part of the detector gives advance warning on the status of the oncoming data position, it is possible to switch from reading to writing without the requirement for a wasted revolution or wasted space. By dividing the signal resulting from a change of reflectance sensed during a write operation by a measure of the intensity of the write laser a read signal free of the write modulation is obtained.

10 Claims, 8 Drawing Figures

SYSTEM FOR PREVENTING THE OVERWRITING OF PREVIOUSLY OPTICALLY RECORDED DATA AND FOR READING OPTICALLY RECORDED DATA DURING WRITING

FIELD OF THE INVENTION

This invention relates to optical data storage systems and more particularly to a circuit for preventing the overwriting of previously recorded data and a circuit for reading optically recorded data during writing.

DESCRIPTION OF THE PRIOR ART

Optical storage disks are widely used in video disk and digital audio disk (DAD) systems.

In such systems a high energy focused laser beam records the data as "data pits or holes" along an information track of an optical data storage disk. To read the recorded data, a low energy focused laser beam scans the recorded track and light reflected from the disk is sensed by a detector. Such systems are more completely described in the article: "Optical Data Storage Technology Status and Prospects" by Alan E. Bell, Computer Design, January 1983, pages 133–146.

One of the most important requirements of such optical data storage systems is the status of the track, i.e., has the track been written previously, or is the track available. In magnetic file systems this can be accomplished by first reading the record and then writing on a subsequent revolution. Other schemes involve using a separate special status head or other storage such as a core or transistor memory to keep track of individual record status. In an optical storage system of many thousands of tracks with a low number of data blocks per track this auxiliary storage becomes very expensive.

Another important requirement of optical data storage systems is the verification of data integrity once the data has been recorded on the disk.

Various methods have previously been described to perform the data integrity verification.

The most often proposed method is the read after write method. In a first implementation of this method the recorded data is read and verified during a subsequent revolution of the disk. The additional process time of this approach is obvious and deemed unacceptable for high performance operation. A second implementation requires a second laser focused at a point trailing the focus point of the write beam. The disadvantage of this method is that it adds cost and complexity.

U.S. Pat. No. 4,402,061 describes an optical storage system wherein three laser beams, i.e., one writing beam and two reading beams are generated by one laser and are focused at spaced locations along a track of an optical disk. One of these beams is a read before write beam which is focused ahead of the writing beam. The reflected beam is sensed by a photodetector which derives a signal when the track ahead contains previously recorded data. This signal is applied to the recording circuitry to interrupt recording. The second beam is a read after write beam for verification of data integrity. While this system performs satisfactorily, the requirement that the initial laser beam should be split into several beams requires a higher energy laser, complicates the mounting of the optical parts of the system and adds to the assembly cost.

SUMMARY OF THE INVENTION

The principal object of the invention is to provide an optical data storage system wherein the reading and writing beams share a common optical path to reduce the time required to locate the next available storage position and to readback the data at the same time it is written.

Another object of the invention is to provide an optical data storage system having a look ahead circuit, wherein a single laser beam is used for writing and preventing the overwriting of previously recorded data, and a readback circuit for reading back the recorded data at the same time it is written.

A further object of the invention is to provide an improved optical data storage system wherein overwriting of previously recorded data is prevented and readback of recorded data is done at the same time it is written without additional optical components.

These objects are accomplished by looking ahead for a previously recorded bit while writing the new data. The leading edge of a previously recorded bit is sensed by a photodetector and the signal generated is used to inhibit writing. During writing of data the reflected light is sensed by the photodetector while the output from a laser monitor photodiode is used to divide out the photodetector signal's amplitude modulation as a result of the laser intensity variations.

DETAILED DESCRIPTION OF THE INVENTION

Figure 1:
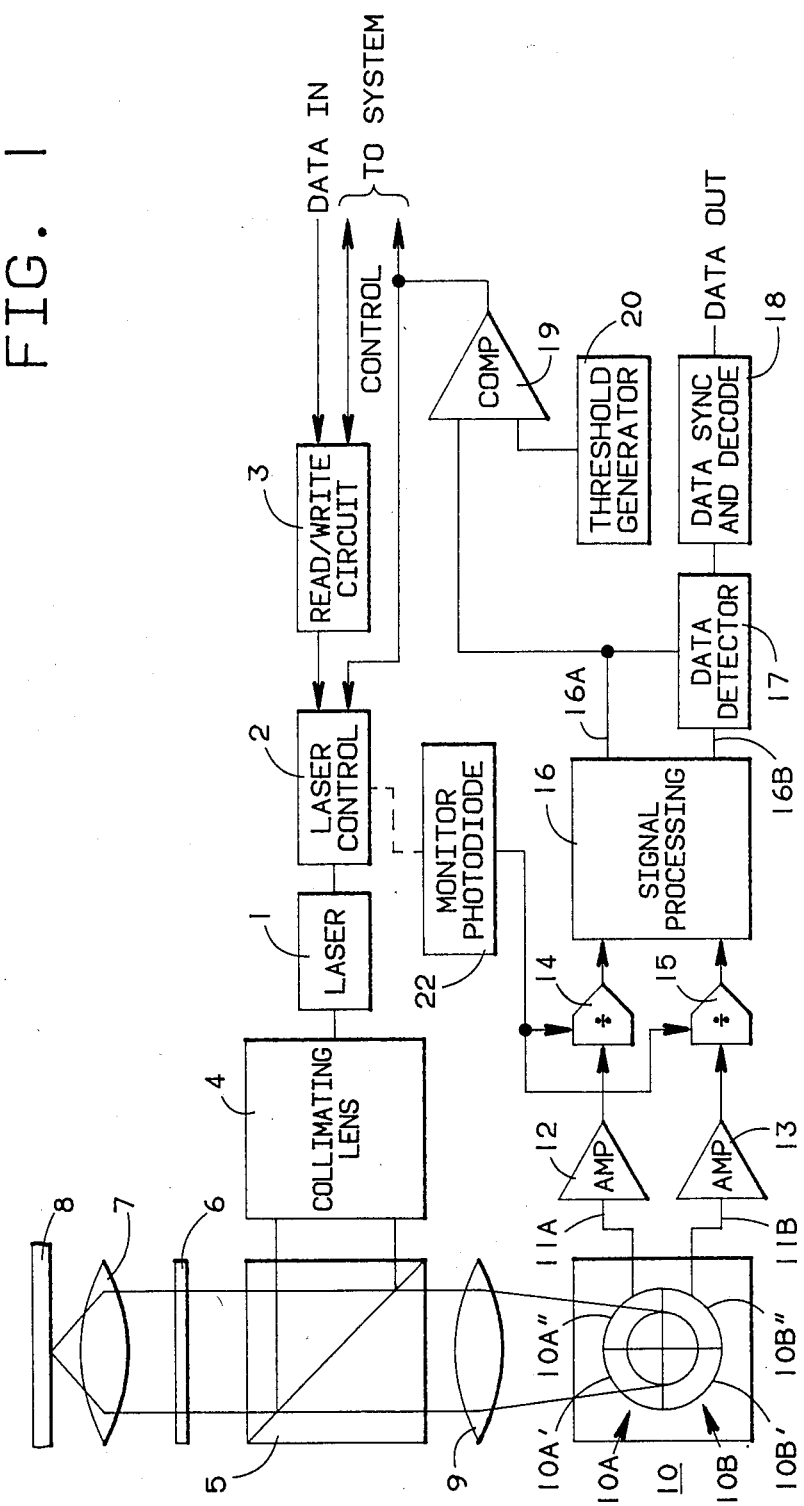
FIG. 1 is an overall block diagram of an optical data storage system incorporating the present invention.

Referring first to FIG. 1, there is shown a general block diagram of an optical data storage system according to the invention. A laser 1, for example a semiconductor laser typically emitting a coherent beam of light at about 800 nm, which can be switched between a high energy or write state and a low energy state or read state by a laser control 2. In the high energy state, laser control 2 drives laser 1 hard enough so that the laser beam has enough energy to alter the recording medium.

To record data, the data is first applied to a read/write circuit 3 which encloses the applied data using for example, a conventional code of the type employed for magnetic recording, such as a run length limited (RLL) code. The encoded data is applied to laser control 2 to switch laser 1 between the high and low energy states to record the data on the medium according to the encoded data pattern.

The linearly polarized laser beam generated by laser 1 is collimated by a collimating lens 4 and enters a polarizing beam splitter 5. The polarized beam is reflected through a quarter wave plate 6, which changes the linear polarization of the beam to circular polarization and passes it to an objective lens 7 that focuses it onto an optical disk 8 where it forms optically detectable changes such as pits or holes or other change of reflectance, in a selected track.

To read back recorded data, a read signal is applied to read/write circuit 3 and laser control 2 to cause laser 1 to emit a low energy linearly polarized laser beam which passes through collimating lens 4 and enters polarizing beam splitter 5. The polarized beam is reflected through quarter wave plate 6 which circularly polarizes the beam and passes it to objective lens 7 which focuses it onto optical disk 8. The beam reflected back from disk 8 is collected by objective lens 7 and passes through quarter wave plate 6 again. The beam is now converted back to a linearly polarized beam, but with its polarization vector rotated by 90°. Because of its polarization, the reflected beam now passes through polarizing beam splitter 5 to lens 9 and photodetector 10.

Photodetector 10 has a substantially circular configuration and includes an upper part 10A having photodetecting elements 10A' and 10A" and a lower part 10B having photodetecting elements 10B' and 10B". Photodetecting elements 10A' and 10A" and 10B' and 10B" generate electrical signals 11A and 11B, respectively, corresponding to the intensity of the light impinging on said upper and lower photodetecting elements. Signals 11A and 11B are applied to amplifiers 12 and 13, respectively. The amplified signals are applied to dividers 14 and 15. The output of a laser monitor photodiode 22 commonly located at the back facet of laser 1 for power monitoring is divided into amplified signals 11A and 11B at dividers 14 and 15. From dividers 14 and 15 the signals pass through a signal processing circuit 16 for equalization and filtering.

The processed signals 16A and 16B are applied to a data detector 17. The data is then synchronized and decoded in a data synchronization and decoding circuit 18 to provide the output data corresponding to data read from disk 8.

Processed signal 16A is also applied to a comparator 19 which is further connected to a threshold generator 20. The output of comparator 19 generates an anticipatory signal when signal 16A exceeds the threshold provided by generator 20. This anticipatory signal is applied to laser control 2 and to the system to prevent overwriting data.

Figure 2:
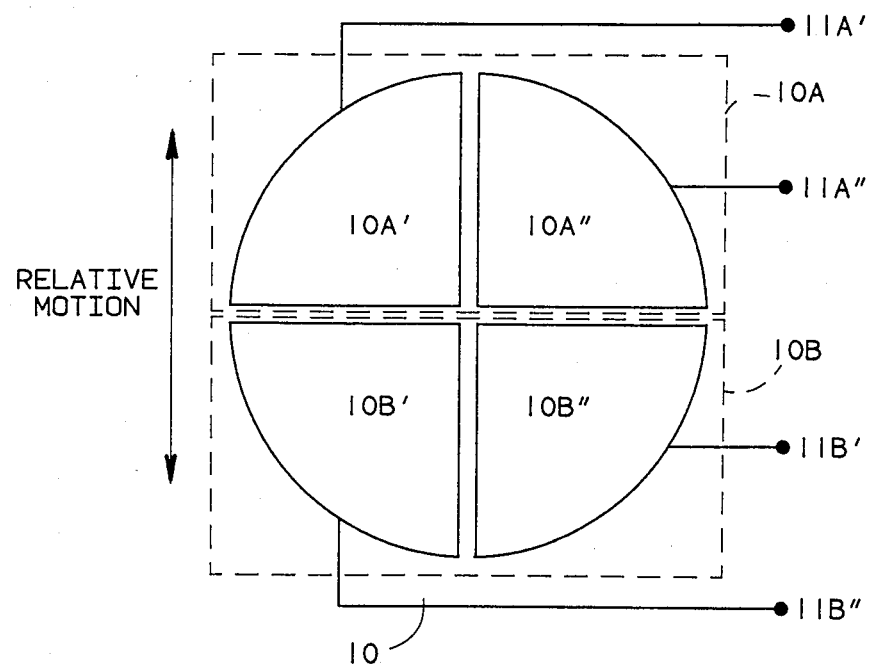
FIG. 2 is a detailed representation of photodetector 10 of FIG. 1.

FIG. 2 is a more detailed representation of photodetector 10 of FIG. 1.

Photodetector 10 may be of the type usually known as a quadrature detector and consists of a single silicon wafer which contains four light sensitive diodes 10A', 10A", 10B', 10B". Light sensitive diodes 10A', 10A", 10B', 10B" are reverse biased and the light falling on a given diode determines the amount of reverse current that flows through that diode. As is well known in the field of optical storage systems, the outputs of the different diodes illuminated by the light reflected from the disk can be amplified, added together and compared to give the data signal (11A'+11A")+(11B'+11B"), the track error voltage (11A"+11B')−(11B"+11A') and the focus error voltage (11A'+11B')−(11A"+11B").

Figure 4A:
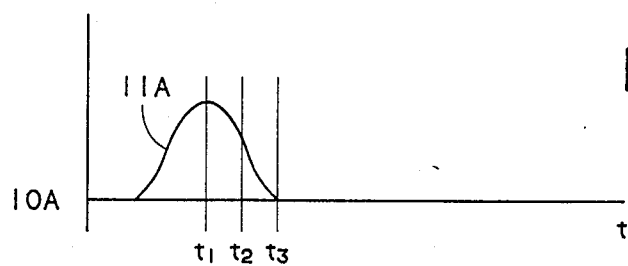
FIGS. 4A and 4B are illustrations of the waveforms associated with the signals generated by photodetector 10 of FIG. 1 at the two different times defined in FIGS. 3A and 3B.
Figure 4B:
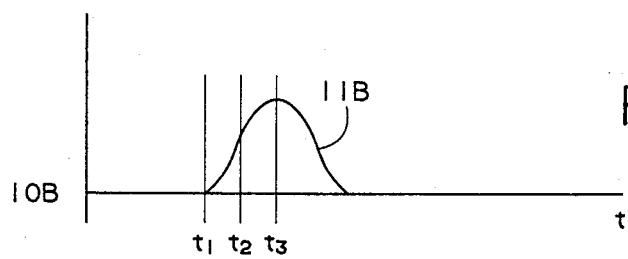
Figure 3A:
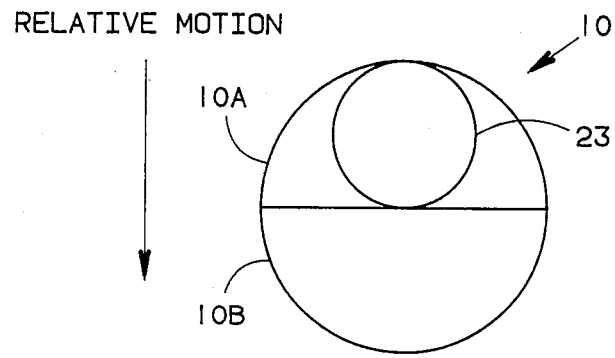
FIGS. 3A and 3B show photodetector 10 of FIG. 1 with the spot of the laser beam corresponding to a hole in the optical disk at two different times.
Figure 3B:
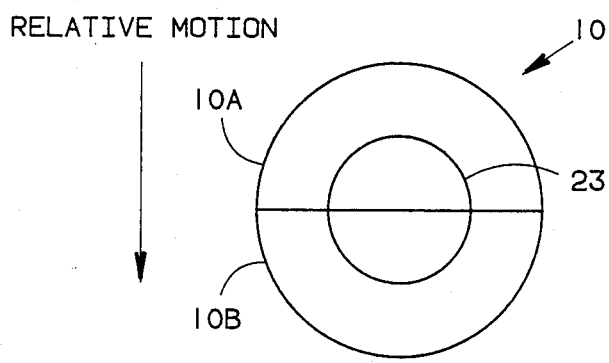

FIGS. 3A and 3B with FIGS. 4A and 4B illustrate how the light reflected from disk 8 and detected by photodetector 10 is used to give advance warning on the status of the oncoming data storage position on disk 8. By dividing the detector in two equal parts along the direction of relative movement, it is possible to determine whether data has been written at a position which is in advance of the center of the area viewed by the detector. The write operation is conditioned on the output of the first part of the detector. Since the first part of the detector gives advance warning on the status of the oncoming data position, it is possible to switch from reading to writing without the requirement for a wasted revolution or wasted space.

A command to store data will result in a write operation in the next available storage position. In a storage position, optical storage systems usually require a multiple number of bytes having a fixed pattern, beginning with a header, for every data block written on an optical disk. This header always starts with a hole as the written bit.

To record a data block, a low intensity laser beam (read beam) is first focused through the optical system, described with reference to FIG. 1, onto the surface of optical disk 8. The laser light is reflected from the surface of the disk, passes back through the optical system and is finally focused into a small spot 23 on photodetector 10.

Whenever a previously written bit or hole, corresponding to the starting hole of the header of a previously written data block is detected by section 10A of photodetector 10 as shown in FIG. 3A, a pulse signal 11A is generated. Signal 11A is applied to amplifier 12 and to signal processing circuit 16. The amplifier and processed signal 16A is applied to a first input of comparator 19. Comparator 19 receives a second input from threshold generator 20. Threshold generator 20 generates a threshold voltage level which is compared to signal 16A to eliminate background or noise. When the level of signal 16A is higher than the threshold voltage level, comparator 19 generates an anticipatory signal indicating a written bit was detected. This anticipatory signal will inhibit the laser control 2 from being switched to the high energy or write state. This is accomplished by using the inhibit signal to block the flow of write data from read/write circuit 3 to laser control 2. Simultaneously the inhibit signal generated by comparator 19 is also sent to the system to notify the system that the write function was inhibited and the data block has to be written in a subsequently available section of disk 8.

When there is no previously written bit on disk 8, no anticipatory signal is generated by photodetector 10, and laser 1 is switched to its high energy state by read/write circuit 3.

FIGS. 4A and 4B illustrate the waveforms associated with the signals generated by parts 10A and 10B of photodetector 10 with respect to the time. As can be seen, a loss of reflectance or signal change at time $t_1$, corresponding to the peak value of signal 11A (FIG. 3A) will always occur prior to time $t_2$, corresponding to the normal write time of the first data bit (FIG. 3B) and to time $t_3$, corresponding to the peak value of signal 11B. Signal 11A can then be used to look ahead of the write beam.

This look ahead operation would effectively be $\frac{1}{4}$ bit time ahead of the normal read time and allow enough time to inhibit overwriting of any data block. Typically, at a 10 MHz data rate, the inhibit signal would occur 10 nanoseconds earlier than the normal read time. This is early enough to issue the inhibit signal, to receive it and to prevent writing over a previously written bit.

During data recording onto the surface of disk 8, the change of reflectance sensed by photodetector 10 in the light beam reflected by disk 8 is further demodulated by the output current of monitor photodiode 22 which gives a measure of laser 1 intensity used in the write operation.

By this process the readback waveform is divided by a measure of the laser intensity, thereby restoring the read signal free of the multiplicative write modulation.

A preferred embodiment of the division circuit will now be described with reference to FIGS. 5A and 5B.

Figure 5A:
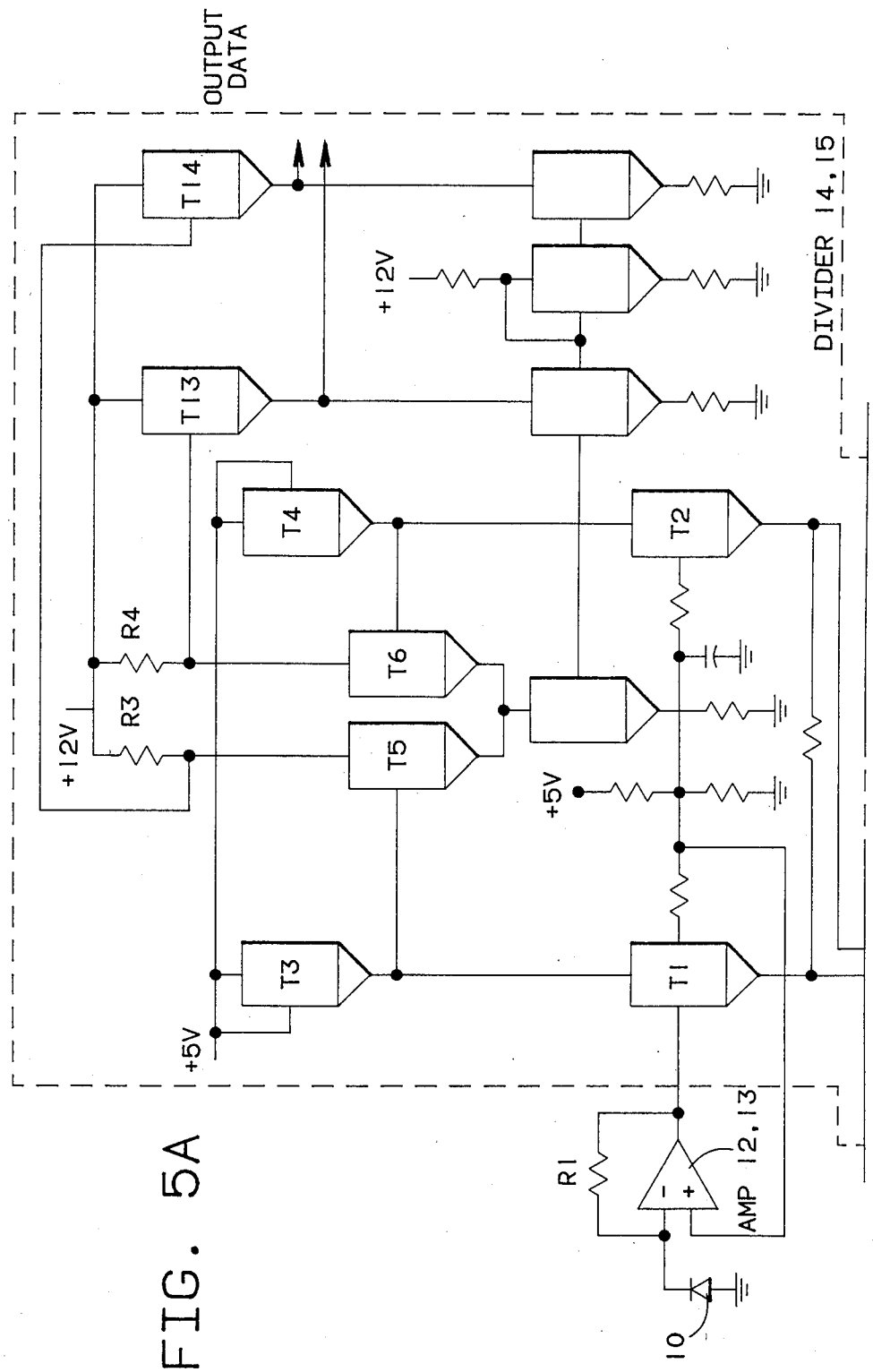
FIGS. 5A and 5B are a detailed representation of a division circuit used in this invention.
Figure 5B:
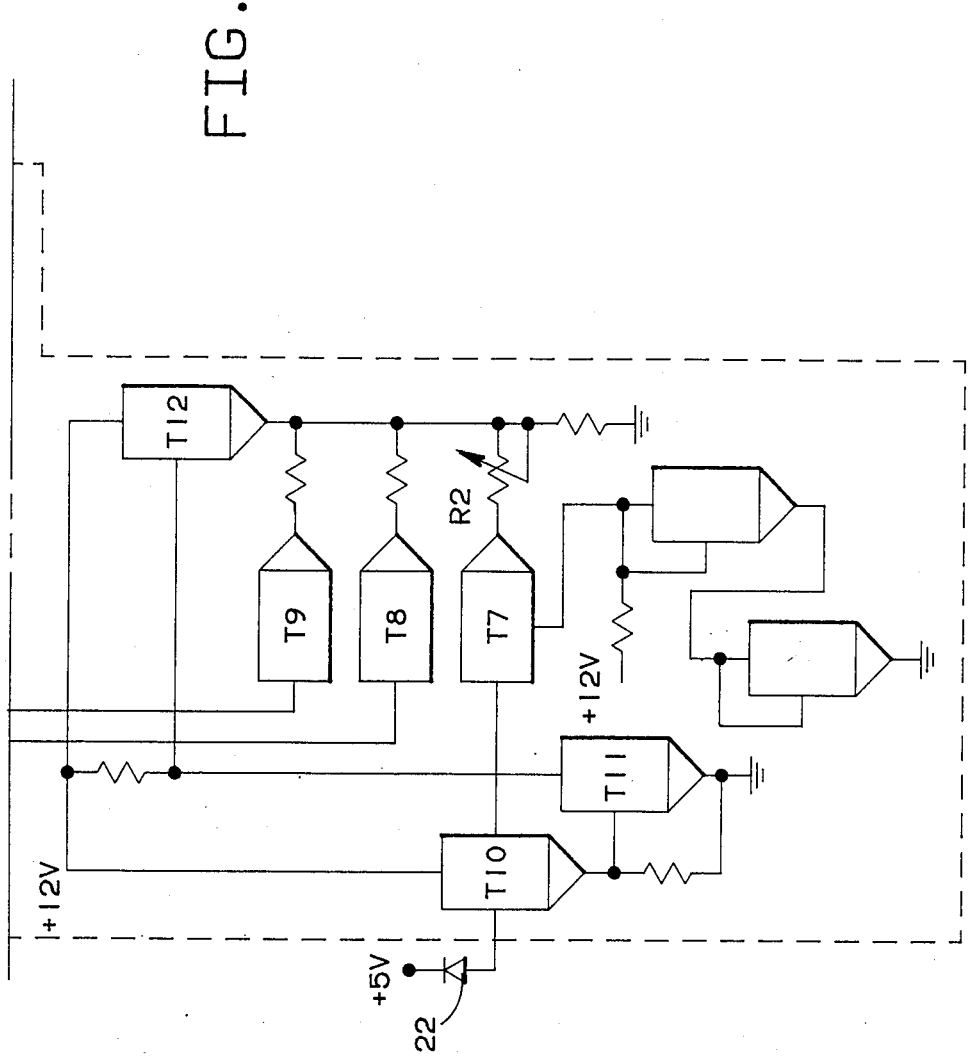

In FIG. 5A, signal current output from photodiode 10 is amplified and changed to a voltage by amplifiers 12 or 13 according to the relationship $V = -I(R1)$. This voltage is applied as an input to differential amplifier composed of transistors T1 and T2.

Differential signal current is applied to collector load impedances composed of transistors T3 and T4, connected as diodes. Additional current is applied to transistors T3 and T4 by common mode current from T8 and T9 in FIG. 5B.

Transistors T8 and T9 collector current is made proportional to current from monitor photodiode 22 by matching current through transistors T8 and T9 with current through transistor T7 and its emitter resistor R2. Transistor T7 is connected within a negative feedback amplifier circuit in conjunction with transistors T10, T11 and T12 to provide an accurate and high-speed measure of the monitor photodiode 22 current.

In FIG. 5A, the voltages at transistors T3 and T4 emitters are proportional to the logarithm of the applied currents. This is inputted to a differential amplifier composed of transistors T5 and T6, the characteristics of which provide collector current proportional to the antilog of input voltage. This current is changed to voltage at collector load resistors R3 and R4 and given as output through buffer transistors T13 and T14.

The resultant function of the circuit gives an output voltage proportional to the current from photodiode 10 divided by the current from monitor photodiode 22.

The look ahead circuit according to the invention considerably reduces the time required to locate an area of the disk suitable for writing data. It provides a system in which it is possible to look ahead for previously written data and to switch from reading to writing without having to change track or to delay writing until the subsequent revolution.

What is claimed is:

1. An optical data storage system having an alterable recording medium, laser means for scanning said alterable recording medium to record data on said medium or read data from said medium, laser control means for driving said laser means at a write state to alter the recording medium and for driving the laster at a read state when reading or not altering the recording medium, and apparatus for preventing the overwriting of data by said laser beam, said apparatus comprising:

radiation detection means responsive to changes in reflected light from said medium as the medium is scanned by said laser beam for generating an output signal representative of data stored at the center of the area scanned by said laser beam;

a portion of said detection means oriented to the relative scanning motion between the laser beam and said medium such that said portion is responsive to changes in reflected light prior to other portions of said detection means as previously recorded data enters the area scanned by the laser beam; said portion generating an anticipatory signal indicating previously recorded data is entering the area scanned by said laser beam;

means responsive to said anticipatory signal for inhibiting said laser control means from switching to the write state if previously recorded data is entering the area scanned by the laser beam.

2. An optical data storage system according to claim 1 further comprising:
means for monitoring the intensity of the laser beam from said laser means, and
means for dividing the output signal from said detection means by the intensity of the laser beam to remove laser beam intensity variations from the output signal whereby the data may be read at the same time the data is recorded on said medium.

3. An optical data storage system according to claim 1 wherein said radiation detection means is a photodetector and said portion generating the anticipatory signal is generated by a first part of said photodetector which is first responsive to changes in the reflected light as previously recorded data enters the area scanned by the laser beam.

4. An optical data storage system according to claim 3 wherein said data output signal is generated by adding said signal generated by said first part of said detection means to the signal generated by a second part of said detection means.

5. An optical data storage system according to claim 1 further comprising:
means for amplifying and processing said data signal and said anticipatory signal.

6. An optical data storage system according to claim 1 wherein said means responsive to said anticipatory signal further comprises:
means for comparing the level of said anticipatory signal to a threshold level.

7. An optical data storage system according to claim 6 wherein said comparing means generate a signal when the level of said anticipatory signal is higher than said threshold level.

8. An optical data storage system according to claim 7 wherein said signal generated by said comparing means is forwarded to a data processing system connected to the optical data storage system to notify the data processing system that a data write operation has been inhibited.

9. Optical data storage system according to claim 2 wherein said means for monitoring the intensity of the laser beam from said laser means is a photodiode.

10. An optical data storage system have an alterable recording medium, laser means for scanning said alterable recording medium to record data on said medium or read data from said medium, laser control means for driving said laser means at a write state to alter the recording medium and for driving the laser at a read state when reading or not altering the recording medium, and apparatus for verifying the writing of data by said laser beam, said apparatus comprising:

radiation detection means responsive to changes in reflected light from said medium as the medium is scanned by said laser beam for generating an output signal representative of data stored at area scanned by said laser beam;

means for monitoring the intensity of the laser beam from said laser means and generating an intensity signal indicative of intensity variations in the laser beam; and means for dividing the output signal from said detection means by the intensity signal to remove laser beam intensity variations from the output signal whereby the data may be read at the same time the data is recorded on said medium.

* * * * *